United States Patent [19]

Dirstine

[11] 4,386,985
[45] Jun. 7, 1983

[54] METHOD OF MAKING CERAMIC DIELECTRIC FOR BASE METAL ELECTRODE CAPACITORS

[75] Inventor: Roger T. Dirstine, Cedarburg, Wis.

[73] Assignee: North American Philips Corporation, New York, N.Y.

[21] Appl. No.: 274,959

[22] Filed: Jun. 18, 1981

Related U.S. Application Data

[62] Division of Ser. No. 164,419, Jun. 30, 1980, abandoned.

[51] Int. Cl.$^3$ ............................................. C04B 39/12
[52] U.S. Cl. ....................................... 156/89; 264/61; 501/134; 501/135; 501/136; 501/137; 501/138; 501/139
[58] Field of Search ............................ 156/89; 264/61; 106/73.31; 252/63.6; 501/134, 135, 136, 137, 138, 139

[56] References Cited

U.S. PATENT DOCUMENTS

| | | | |
|---|---|---|---|
| 2,402,516 | 6/1946 | Wainer | 106/73.31 |
| 2,695,240 | 11/1954 | Oshry | 106/73.31 |
| 2,918,381 | 12/1959 | Plessner et al. | 106/73.31 |
| 3,920,781 | 11/1975 | Eror et al. | 264/61 |
| 3,987,347 | 10/1976 | Burn | 106/73.31 |
| 4,082,906 | 4/1978 | Amin et al. | 156/89 |
| 4,089,813 | 5/1978 | Alexander | 106/73.31 |
| 4,115,493 | 9/1978 | Sakabe | 106/73.31 |

FOREIGN PATENT DOCUMENTS

662532  4/1979  U.S.S.R. ........................... 106/73.31

*Primary Examiner*—Caleb Weston
*Attorney, Agent, or Firm*—Marc D. Schechter

[57] ABSTRACT

A ceramic dielectric based on the oxides of Ba, Ti, Ca, and Zr is doped with magnesium oxide and nickel oxide (or other base metal). The dielectric composition can be sintered with nickel (or other base metal) electrodes in a broad range of reducing atmospheres to provide capacitors with stable and uniformly good dielectric properties.

2 Claims, 5 Drawing Figures

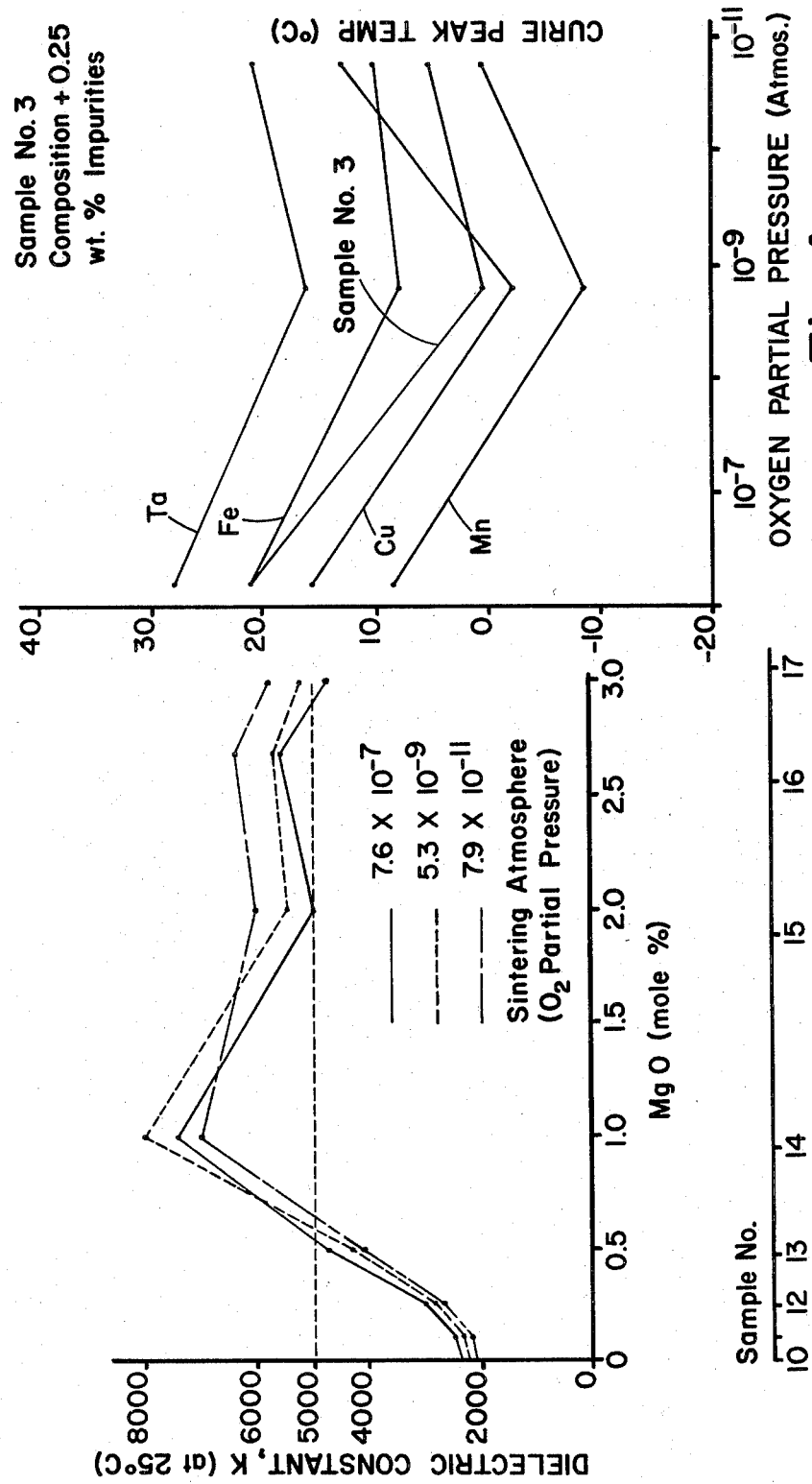

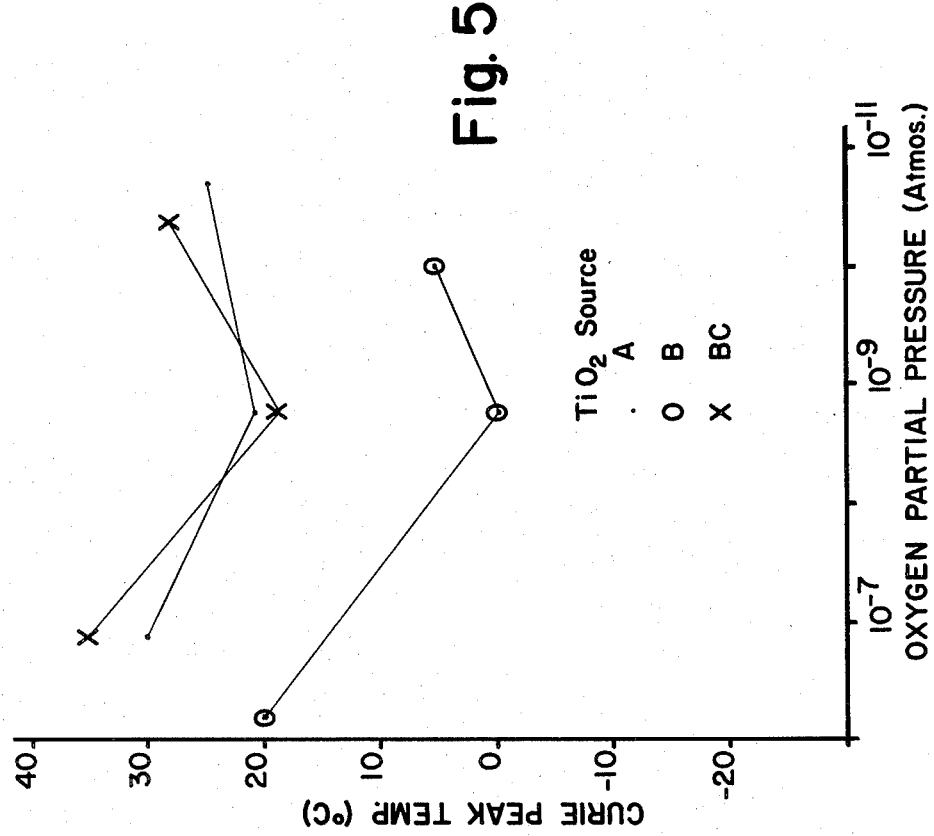

METHOD OF MAKING CERAMIC DIELECTRIC FOR BASE METAL ELECTRODE CAPACITORS

This is a division, of application Ser. No. 164,419, filed June 30, 1980 abandoned.

BACKGROUND OF THE INVENTION

1. Field of the Invention

The present invention relates to a ceramic dielectric composition useful in the manufacture of ceramic capacitors having base metal electrodes capable of being cofired during the sintering of the ceramic.

2. Description of Prior Art

Base metal electrode ceramic capacitors, dielectric compositions from which they are made, and methods for their manufacture are well known in the art. The primary advantage of these capacitors is the elimination of costly noble or other precious metal electrode systems. Typically, base metal electrode capacitors of the monolithic or multilayer type are made with barium titanate-based compositions and are sintered in reducing atmospheres to prevent oxidation of the base metal electrodes. Partial replacements for Ba and Ti, for example Ca and Sr for Ba, and Zr and Hf for Ti, are used to enhance the dielectric properties of the capacitors and/or to shift the dielectric (Curie) peak to normal operating temperatures. The replacements typically have the same valency as the atom replaced. It is also known that sintering these compositions in atmospheres of low oxygen partial pressure tends to render the ceramic semiconductive and, to inhibit the detrimental formation of a semiconductive body, suitable acceptor dopants are also added to the ceramic compositions. Typical of dopants used in the art are Mg, Al and Ga, and certain transition metals such as Cr, Mn, Fe, Co and Ni.

The addition of acceptor dopants, however, often results in at least two other problems, both affecting the Curie peak position of the sintered material. One problem is the need to carefully control the amount of the dopant added, particularly at low concentration levels, and the other concerns the generally observed broad change in the Curie peak temperature with changes in the oxygen partial pressure of the atmosphere in which the ceramic is sintered.

U.S. Pat. Nos. 3,920,781, 4,089,813, 4,115,493 and 3,987,347 are representative of the prior art teachings of compositions and methods for making base metal electrode ceramic capacitors. U.S. Pat. No. 3,920,781 discloses the addition of acceptor dopants in a barium titanate composition and a careful additional cation balancing to maintain the large to small cation ratio between 0.95 and 1.0 (large and small cations being defined, respectively, as those having ionic radii greater and less than 0.90 Angstrom unit). Although good results in the form of capacitors exhibiting suitable dielectric properties are reported, this patent teaches the necessity of maintaining absolute control over the reducing atmosphere in which the capacitors are fired to prevent dissolution and degradation of the base metal (nickel) electrodes. Further, with a decrease in the oxygen partial pressure of two orders of magnitude from the disclosed maximum of $10^{-7}$ atmosphere, U.S. Pat. No. 3,920,781 reports an unacceptably large increase of about 50° C. in the Curie peak temperature.

U.S. Pat. No. 4,089,813 also discloses a barium titanate based composition to which are added various mixed or binary oxides. Also included is a substantial addition of barium oxide such that the large to small cation ratios of the compositions in the ranges disclosed are maintained at or slightly above 1.00. The compositions disclosed in this patent are suitable for the manufacture of ceramic dielectrics with relatively low permittivities (dielectric constants up to about 2200), but would be unsuitable for the manufacture of high K monolithic capacitors.

U.S. Pat. No. 4,115,493 discloses a range of compositions based on barium titanate with isovalent substitutions of calcium and zirconium and to which an excess of Ba and Ca is added, to maintain a large to small cation ratio (L/S) of from 1.005 to 1.03. Although no acceptor dopants are intentionally added to the disclosed compositions, the stated purities of the starting compounds suggest the presence of impurities at levels up to 1%. It is well known, as illustrated in their Example 3, that impurities at such concentrations can have a significant effect on the ultimate dielectric properties of a ceramic capacitor.

U.S. Pat. No. 3,987,347 teaches the importance of close control of acceptor dopant concentrations in ceramic compositions for base metal electrode capacitors. This patent teaches that it is essential to limit the acceptor dopants to very small quantities, the total of which should not exceed 2.5 mole %. The range of compositions disclosed is balanced to maintain a large to small cation ratio of 0.975 to 1.00. The compositions disclosed in this patent are suitable for the manufacture of ceramic dielectrics with relatively low permittivities (dielectric constants up to about 3000), but would be unsuitable for the manufacture of high K monolithic capacitors.

SUMMARY OF THE INVENTION

It is an object of the invention to provide a ceramic dielectric composition, suitable for use in monolithic base metal electrode capacitors, wherein the composition may be sintered in atmospheres having a relatively broad range of partial oxygen pressures yet always resulting in a ceramic dielectric with low power dissipation and high dielectric constant near room temperature.

In the present invention, a doped $BaTiO_3$ composition, with minor isovalent substitutions of Ca and Sr for Ba, and Zr and Hf for Ti, includes at least approximately 1 mole % MgO. MgO doping has been found to provide excellent control and broad stability of Curie peak temperatures and relative insensitivity to the oxygen partial pressure of the sintering atmosphere. According to the invention, the ceramic composition has a ratio of large cations to small cations between 0.89 and 0.98. Preferably, the composition is prepared with a substantial excess of small cations, such that the total large to small cation ratio is less than 0.95 and substantially below the ratios of near unity taught as essential in the prior art. Additional doping with Ni, or other metal corresponding to the base metal electrode used, protects against dissolution of the electrodes during sintering and helps to optimize the Curie peak temperatures at the preferred Mg concentrations.

BRIEF DESCRIPTION OF THE DRAWING

FIG. 3 is a graph of the dielectric constant, measured at 25° C., versus the concentration of MgO in the various samples at various oxygen partial pressures during sintering.

FIG. 4 is a graph of the Curie peak temperature versus the oxygen partial pressure during sintering for samples with various impurity dopants.

FIG. 5 is a graph of the Curie peak temperature versus the oxygen partial pressure during sintering for dielectric compositions which vary by the source or characteristics of the $TiO_2$ powder used in the mixture.

DESCRIPTION OF THE PREFERRED EMBODIMENTS

Figures 1, 2:
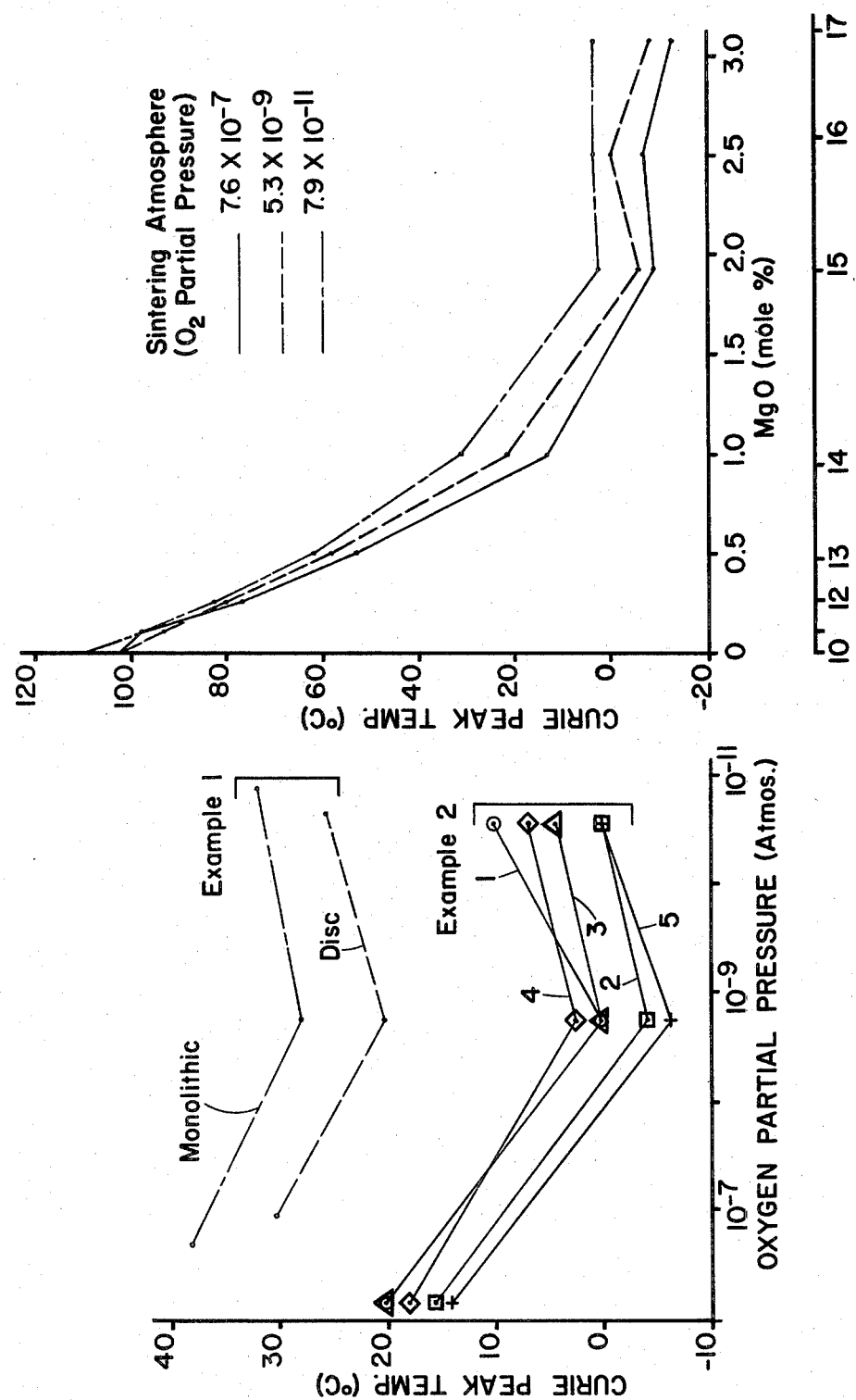
FIG. 1 is a graph of the Curie peak temperature versus the oxygen partial pressure during sintering for Examples 1 and 2.
FIG. 2 is a graph of the Curie peak temperature versus the concentration of MgO in the various samples at various oxygen partial pressure during sintering.

In the examples which follow, the component compounds used for the various disclosed compositions were in the form of oxides or carbonates of the individual components (binary oxides or carbonates). It is recognized that, to provide high dielectric constant ceramics (K in excess of 5000), these oxides or carbonates of the components are preferred. The use of such starting materials allows for more uniform mixing and sintering of the compositions.

EXAMPLE 1

A composition comprising the following component compounds in proportions indicated by mole percents was prepared: 45.01% BaO(as $BaCO_3$), 2.77% CaO(as $CaCO_3$), 45.17% $TiO_2$, 2.77% MgO(as $MgCO_3$), 2.77% $ZrO_2$ and 1.51% NiO. The component compounds were all high purity reagent grades which were mixed in the stated proportions, vibratory milled for one hour, calcined for 16 hours at 1050°–1100° C., and crushed to pass a 60 mesh sieve. The powder was used to prepare both disc and multilayer (monolithic) ceramic capacitor bodies.

The discs, used primarily for testing the dielectric properties, were pressed from the powder in a ½ inch die, sintered for one to two hours at temperatures and in atmospheres to be detailed hereinafter. After sintering, indium alloy electrodes were applied to both disc faces.

The monolithic bodies were formed in a typical, well known manner by mixing the powder with a solvent, an organic binder and a plasticizer, milling the mixture for about two hours, casting a tape using a doctor blade technique, screening a nickel electrode on the tape, and pressing 20-layer laminated bodies from the stacked tape. These monolithic bodies were sintered in the same manner as the discs and provided with appropriate end terminations, after sintering, to form monolithic ceramic capacitors.

Both disc and monolithic samples were fired at 1400° C. in reducing atmospheres with oxygen partial pressures ($P_{O2}$) ranging from $1\times10^{-11}$ to $3\times10^{-7}$ atmospheres. The results of measured electrical properties are shown in Table 1.

TABLE 1

| TYPE | Firing Atmos.* $P_{O2}$ | Tcp (°C.) | K | D.F. (%) | τ(sec.) |
|---|---|---|---|---|---|
| Disc | $1\times10^{-7}$ | 30 | 4300 | 1.5 | 2060 |
|  | $3\times10^{-9}$ | 20 | 4400 | 1.8 | 856 |
|  | $3\times10^{-11}$ | 25 | 10,500 | 2.0 | 1742 |
| Monolithic | $3\times10^{-7}$ | 37 | 10,700 | 4.2 | 14,400 |
|  | $3\times10^{-9}$ | 27 | 9200 | 1.8 | 480 |

TABLE 1-continued

| TYPE | Firing Atmos.* $P_{O2}$ | Tcp (°C.) | K | D.F. (%) | τ(sec.) |
|---|---|---|---|---|---|
|  | $1\times10^{-11}$ | 32 | 9600 | 2.3 | 25 |

*Firing temperature 1400° C.
$P_{O2}$—oxygen partial pressure
Tcp—Curie peak temperature
K—dielectric constant
D.F.—dissipation factor
τ—dielectric relaxation Good overall dielectric properties were attained, but of particular interest is the very small change in Curie peak temperature over the wide range of sintering atmospheres with oxygen partial pressures varying by four orders of magnitude or more. Further, instead of the typical large increase in the Curie peak temperature with decreasing oxygen partial pressure as shown in the prior art, both the disc and monolithic samples of the present invention exhibited similar non-linear changes, characterized by decreasing Curie peak temperatures with decreasing oxygen partial pressures to minimums at about the mid-range of $3\times10^{-9}$ atmosphere. With further decreasing oxygen partial pressures to $1\times10^{-11}$ atmosphere, the Curie peak temperatures increased. This phenomonon is illustrated graphically in FIG. 1 where capacitors of both monolithic and disc constructions are shown to exhibit similar non-linear changes in Curie peak temperatures. As a result, the total change in Curie temperatures, over similar broad ranges in firing atmospheres, was only 10° C.

In the composition of Example 1, an excess of small Ti cations over large Ba cations, resulting in an initial large to small cation ratio of less than one, was found to provide the best properties. In addition, the small cation acceptor dopants, MgO and NiO, result in a final large to small cation ratio for the Example 1 compositions of 0.914, which is far below the minimum taught by the prior art. Further, the amount of acceptor dopants totaling 4.28 mole% is greatly in excess of the preferred maximum limit of 1.3 mole % disclosed in the prior art.

It should be pointed out that for comparison with the prior art upper limits of total acceptor dopant concentrations (e.g. as taught in U.S. Pat. No. 3,987,347), the mole percentages expressed herein for all compositions were calculated on the basis of the precursor compounds, i.e. BaO, $TiO_2$, CaO, $ZrO_2$, MgO (and NiO). If, however, the mole percent of a component compound is expressed in relation to the same composition, i.e. $BaTiO_3$ and $CaZrO_3$, its value will be substantially different. For example, if the 2.5 mole % upper limit on acceptor dopant additions disclosed in the above patent were converted to the equivalent mole % in the identical composition, but stated in terms of its precursor compounds, the upper limit would be about 1.3 mole %. This is, therefore, the value that should be used for comparison with the results disclosed and ranges claimed for the present invention.

The range of sintering atmospheres was based on the preferred use of nickel as the electrode material in monolithic capacitors. It is known that Ni will oxidize at 1400° C. in an atmosphere having an oxygen partial pressure in excess of $1.7\times10^{-6}$ and the atmosphere must, therefore, be at least reducing to Ni. Further, it is known that Ni is essentially insoluble in the ceramic at oxygen partial pressures below about $10^{-11}$ atmosphere. The sintering atmosphere should be maintained within these limits when firing at about 1400° C. If other base metal electrodes, for example cobalt, are used, the metal-metal oxide equilibrium and the metal oxide solubility limits would have to likewise be considered.

EXAMPLE 2

In order to examine the effects of Ca substitution for Ba and to determine the useful range of such substitutions within the scope of the present invention, a number of compositions were prepared in the same manner as and corresponding closely to the preferred composition of Example 1, but with the Ca substitution (as CaO) for Ba(as BaO) varied in both directions from the preferred 2.77 mole %. Disc capacitors were fabricated from each of the compositions, in the same manner as the Example 1 composition, and sintered in three different atmospheres covering the generally preferred range of oxygen partial pressures described for Example 1. Table 2 lists the compositions by mole % CaO which was substituted for BaO at a maximum concentration in Sample 1 of 47.74 mole %. The total concentration of BaO and CaO was maintained at a constant 47.74±0.02 mole %. All the remaining component compounds were maintained at concentrations corresponding to the Example 1 composition. Table 2 also lists the varying sintering conditions and the measured dielectric properties for all samples.

TABLE 2

| Sample No. | Sintering Atmosphere ($PO_2$) & Temp. | CaO (mole %) | K | D.F. (%) | Curie Temp. (°C.) |
|---|---|---|---|---|---|
| 1 | | 0 | 6100 | 0.27 | 20 |
| 2 | $8.0 \times 10^{-7}$ | 1.39 | 8700 | 0.54 | 15 |
| 3* | 1402° C. | 2.77 | 8200 | 0.55 | 20 |
| 4 | | 4.30 | 6400 | 0.85 | 18 |
| 5 | | 7.16 | 4400 | 0.59 | 13 |
| 1 | | 0 | 4500 | 0.36 | 0 |
| 2 | $3.0 \times 10^{-9}$ | 1.39 | 4300 | 0.17 | −4 |
| 3* | 1405° C. | 2.77 | 4900 | 1.00 | 0 |
| 4 | | 4.30 | 4800 | 1.94 | 2 |
| 5 | | 7.16 | 4000 | 0.95 | −6 |
| 1 | | 0 | 4800 | 0.11 | 10 |
| 2 | $5.3 \times 10^{-11}$ | 1.39 | 5200 | 0.26 | 0 |
| 3* | 1405° C. | 2.77 | 5400 | 0.49 | 5 |
| 4 | | 4.30 | 5500 | 0.43 | 7 |
| 5 | | 7.16 | 4300 | 0.31 | 0 |

*Example 1 Composition

As is apparent from Table 2, the substitution for BaO of CaO up to about 7 mole % has little effect on the overall dielectric properties for capacitors fired in each of the three atmospheres used. The dielectric constants (K) for most samples were close to or in excess of the preferred minimum of 5000. The lower values of K for each sintering condition were at the extremes of the CaO substitution and the higher values were near the preferred 2.77 mole % substitution. The dissipation or loss factors (D.F.) were uniformly good. It is also apparent that the variation in Ca content has very little effect on the position of the Curie peak for a given firing atmosphere, the maximum shift of 10° C. occurring in the samples fired at the lowest oxygen partial pressure ($5.3 \times 10^{-11}$). Referring to FIG. 1, the Example 2 samples exhibit the same non-linear change in Curie peak temperature with decreasing oxygen pressures as did the samples of Example 1, indicating that variations in the calcia content do not alter this characteristic.

When comparing the plots in FIG. 1 it should be pointed out that the Sample 3 of Example 2 has the same composition as Example 1. Since Sample 3 was fabricated into a disc capacitor in the same manner as the composition of Example 1, one would expect the curves for Sample 3 and disc to match.

As a result of experimentation conducted to determine the cause of this anomaly, it was discovered that the two compositions contained reagent grade $TiO_2$ powder from two different suppliers. One powder, powder A, has a specific surface area of 6.6 m²/gram, the other, powder B had a specific surface area of 11.2 m²/gram. FIG. 5 shows plots of the Curie peak temperature versus the oxygen partial pressure during sintering for dielectric compositions including $TiO_2$ powders A and B, respectively.

Also shown in FIG. 5 is a plot for a dielectric composition including $TiO_2$ powder BC. Powder BC was prepared by calcining powder B at 1050° C. for 3 hours and then sifting the powder through a 60 mesh screen. The specific surface area of powder BC was 2.1 m²/gram. The results indicate that as the specific surface area of the starting $TiO_2$ increases, and as a result the powder characteristics change, the Curie temperature is shifted to lower temperatures. It should be noted, however, that the shapes of the curves in FIG. 5 are essentially identical. As a result, one with ordinary skill in the art could compensate for the Curie peak shift due to starting material by varying the Ti/Zr ratio in the mixture, as further discussed below.

EXAMPLE 3

The effects of variations in substitutions of Zr for Ti and the useful ranges thereof were examined in additional disc samples which were prepared in the manner described for the previous examples. In these samples, Zr (as $ZrO_2$) and Ca were substituted in equal amounts for Ti and Ba, respectively. The formulations of the samples, in mole % of the component compounds, are set forth in Table 3. Sample No. 3, having the preferred composition, is included for comparison. The results of the dielectric measurements for Example 3 are shown in Table 4.

TABLE 3

| | Sample No. | | | | |
|---|---|---|---|---|---|
| Component | 6 | 7 | 3 | 8 | 9 |
| BaO | 46.74 | 45.79 | 45.01 | 43.90 | 42.93 |
| CaO | 0.96 | 1.91 | 2.77 | 3.81 | 4.77 |
| $TiO_2$ | 46.93 | 45.98 | 45.17 | 44.04 | 43.09 |
| $ZrO_2$ | 0.95 | 1.90 | 2.77 | 3.82 | 4.79 |
| MgO | 2.77 | 2.77 | 2.77 | 2.77 | 2.77 |
| NiO | 1.65 | 1.65 | 1.51 | 1.66 | 1.66 |

TABLE 4

| Sample No. | Sintering Atmosphere ($PO_2$) & Temp. | $ZrO_2$ (mole %) | K | D.F. (%) | Curie Temp. (°C.) |
|---|---|---|---|---|---|
| 6 | | 0.95 | 5100 | 0.73 | 40 |
| 7 | $5.5 \times 10^{-7}$ | 1.90 | 7700 | 0.85 | 24 |
| 3 | 1403° C. | 2.77 | 8200 | 0.55 | 20 |
| 8 | | 3.82 | 6600 | 0.80 | 5 |
| 9 | | 4.79 | 5300 | 0.23 | −6 |
| 6 | | 0.95 | 5300 | 0.42 | 35 |
| 7 | $5.3 \times 10^{-9}$ | 1.90 | 6300 | 0.96 | 13 |
| 3 | 1400° C. | 2.77 | 4900 | 1.00 | 0 |
| 8 | | 3.82 | 4400 | 0.80 | −11 |
| 9 | | 4.79 | 3300 | 0.10 | −22 |
| 6 | | 0.95 | 5300 | 0.42 | 32 |
| 7 | $6.6 \times 10^{-11}$ | 1.90 | 6300 | 0.54 | 15 |
| 3 | 1403° C. | 2.77 | 5400 | 0.49 | 5 |
| 8 | | 3.82 | 4800 | 0.28 | −4 |
| 9 | | 4.79 | 3600 | 0.08 | −17 |

From the results shown in Table 4, it can be seen that with an increase in the Zr content, a linear decrease in the Curie peak temperature occurs. In Example 2 it was previously shown that, at a given set of sintering conditions, an increase in the Ca content has only a slight effect on the Curie temperature. Thus, as is known in the art of preparing conventional air-fired $BaTiO_3$—$CaZrO_3$ dielectrics, the Zr substitutions are primarily responsible for the large linear decrease in the Curie temperature. This is, of course, important because it is desirable to shift the Curie peak to the room temperature range.

The other dielectric properties listed in Table 4 further confirm the uniformly good dielectric constants (K) and dissipation factors (D.F.) attained over a broad range of sintering atmospheres. Only the high zirconia samples (No. 9) fired at low oxygen partial pressures exhibited poor properties, i.e. low K.

EXAMPLE 4

All samples previously reported herein included concentrations of MgO as an acceptor dopant at 2.77 mole%. To examine the effects of variations in the Mg concentration, samples were prepared comprising BaO and $TiO_2$ at equal concentrations ranging from 47.00 to 45.55 mole % each, CaO and $ZrO_2$ at equal concentrations ranging from 3.00 to 2.91 mole % each, and MgO ranging from 0 to 3.08 mole %. Disc capacitors were prepared from the samples following the procedure described above and samples of each MgO concentration were sintered in three different reducing atmospheres. Table 5 lists the measured dielectric properties.

TABLE 5

| Sample No. | Sintering Atmosphere ($P_{O_2}$) & Temp. | MgO (mole %) | K | D.F. (%) | Curie Temp.(°C.) |
| --- | --- | --- | --- | --- | --- |
| 10 |  | 0 | 2300 | 0.26 | 103 |
| 11 |  | 0.09 | 2400 | 0.80 | 98 |
| 12 | $7.6 \times 10^{-7}$ | 0.24 | 2950 | 0.31 | 78 |
| 13 | 1406° C. | 0.47 | 4700 | 0.64 | 54 |
| 14 |  | 0.95 | 7300 | 0.31 | 13 |
| 15 |  | 1.92 | 5000 | 0.05 | −8 |
| 16 |  | 2.56 | 5600 | 0.38 | −6 |
| 17 |  | 3.08 | 4250 | 0.11 | −12 |
| 10 |  | 0 | 2200 | 0.89 | 103 |
| 11 |  | 0.09 | 2300 | 0.63 | 95 |
| 12 | $5.3 \times 10^{-9}$ | 0.24 | 2800 | 0.34 | 80 |
| 13 | 1400° C. | 0.47 | 4200 | 0.17 | 59 |
| 14 |  | 0.95 | 7500 | 1.67 | 22 |
| 15 |  | 1.92 | 5400 | 1.10 | −5 |
| 16 |  | 2.56 | 5700 | 1.50 | 0 |
| 17 |  | 3.08 | 4900 | 1.23 | −7 |
| 10 |  | 0 | 2100 | 0.31 | 108 |
| 11 |  | 0.09 | 2200 | 0.21 | 98 |
| 12 | $7.9 \times 10^{-11}$ | 0.24 | 2700 | 0.19 | 82 |
| 13 | 1400° C. | 0.47 | 4100 | 0.34 | 63 |
| 14 |  | 0.95 | 7000 | 0.78 | 33 |
| 15 |  | 1.92 | 6000 | 0.22 | 3 |
| 16 |  | 2.56 | 6300 | 0.58 | 5 |
| 17 |  | 3.08 | 5450 | 0.43 | 5 |

It is clear from the test results set forth in Table 5 that large linear downward changes in the Curie peak temperature occur for relatively small additions of the MgO dopant up to about 1 mole%. Correspondingly, large linear increases occur simultaneously in the effective dielectric constants, K, measured at room temperature. These two large linear changes are shown graphically in FIGS. 2 and 3 and can be seen to be virtually unaffected by the sintering atmospheres over the range tested. With small dopant additions up to about 1 mole %, however, very small variations from the desired concentration can result in very substantial shifts in the Curie peak (80° to 90° C./mole % MgO) and related dielectric properties. Small variations in concentration may arise, for example, from mixing or from variations in the purity of starting compounds.

Based on the results shown in Table 5 and discussed hereinabove, the mole % additions of MgO should be at least approximately 1.0, preferably in the range of about 1.0 to 3.0. There is a general leveling of the Curie peak position in this range and very little change in Curie peak temperatures or dielectric constants with large variations in the oxygen partial pressures of the sintering atmosphere. In FIG. 3, the dashed horizontal line indicates the preferred minimum of 5000 for high dielectric constant materials. All samples in Table 5 having MgO concentrations of about 1 mole % or greater were at or above this minimum, except for Sample No. 17 fired in the two most oxidizing atmospheres. The dielectric constants of both were, however, very close to the acceptable minimum.

Due to the fact that Mg is a small cation, as defined above, the ratio L/S is approximately 0.98 for sample 14 (0.95 mole% MgO).

EXAMPLE 5

The MgO dopant concentration of the invention ranges from 1.0 to 3.0 mole %. In this example, NiO is added in amounts of about 1.0 to 2.0 mole %. The NiO additions are particularly important to optimize the dielectric properties, in particular the room temperature dielectric constant. Also NiO aids to preserve Ni electrode integrity in monolithic capacitor construction. Thus, the total acceptor dopant concentration in the compositions of the present invention ranges from about 2.0 to 5.0 mole %.

To examine the efficacy of NiO additions, disc capacitors were prepared from the compositions of Sample Nos. 15 and 17 of Example 4 with NiO additions comprising 1.50 mole % of each modified composition. These samples were then labeled sample Nos. 15N and 17N. The results of the measurements of the dielectric properties, including for comparative purposes the properties of Sample Nos. 15 to 17 (previously listed in Table 5), are shown in Table 6.

TABLE 6

| Sample No. | Sintering Atmosphere ($P_{O_2}$) | MgO (mole %) | NiO (mole %) | K | D.F. (%) | Curie Temp.(°C.) |
| --- | --- | --- | --- | --- | --- | --- |
| 15 |  | 1.92 | 0 | 5000 | 0.05 | −8 |
| 15N | $7.6 \times 10^{-7}$ | 1.88 | 1.50 | 7700 | 0.78 | 13 |
| 17 |  | 3.08 | 0 | 4250 | 0.11 | −12 |
| 17N |  | 2.98 | 1.50 | 7300 | 0.65 | 10 |
| 15 |  | 1.92 | 0 | 5400 | 1.10 | −5 |
| 15N | $5.3 \times 10^{-9}$ | 1.88 | 1.50 | 5100 | 1.26 | −1 |
| 17 |  | 3.08 | 0 | 4900 | 1.23 | −7 |
| 17N |  | 2.98 | 1.50 | 7900 | 0.89 | −4 |
| 15 |  | 1.92 | 0 | 6000 | 0.22 | 3 |
| 15N | $7.9 \times 10^{-11}$ | 1.88 | 1.50 | 6100 | 0.53 | 5 |
| 17 |  | 3.08 | 0 | 5450 | 0.43 | 5 |
| 17N |  | 2.98 | 1.50 | 5000 | 1.62 | 5 |

The beneficial effects of the NiO addition, particularly at the higher oxygen partial pressures ($P_{O_2}$) of the sintering atmospheres, are clearly shown in Table 6. At the highest $P_{O_2}$ of $7.6 \times 10^{-7}$, where nickel is near the point of maximum solubility, the beneficial effects of the NiO addition are most significant. Thus, under these sintering conditions, there is a substantial increase in the dielectric constants (K) of both modified compositions. In addition, the Curie peak temperatures of both modified compositions were raised by the same amount, from the unmodified compositions of Sample Nos. 15 and 17, to a range much closer to the room temperature optimum. The dissipation factors (D.F.) remained good. Only moderate dielectric enhancement resulted in the modified samples, 15N and 17N, fired in the intermediate atmosphere and at the lowest $P_{O2}$ of $7.9 \times 10^{-11}$ where nickel is nearly insoluble in barium titanate, the dielectric properties were virtually unchanged. Nonetheless, good overall properties were obtained with the sintering atmospheres. The large to small cation ratios of the compositions of Sample Nos. 15N and 17N are 0.935 and 0.914, respectively, again substantially below the acceptable minimum taught by the prior art.

The nickel additions have the added beneficial effect of maintaining the integrity of the nickel electrodes which may be applied to the green capacitor bodies and cofired therewith. By doping the ceramic composition with NiO, dissolution and degradation of the Ni electrodes during sintering is prevented. It is believed that, with the use of other base metal electrode materials, such as cobalt (Co), doping the composition with the same metal or another base metal will likewise eliminate electrode degradation during sintering.

EXAMPLE 6

Two compositions were prepared to determine the effects of the substitution for NiO of another base metal oxide. Compositions similar to that defined in Example 1 were prepared with CoO (as $Co_2O_3$) substitutions of 1.71 and 3.26 mole % in place of NiO. Disc capacitors were prepared in the same manner as in the previous examples with samples of each composition sintered in the same three atmospheres. The measured dielectric properties of the capacitors ranged as follows:

Dielectric constant (K)—5100 to 6500
Dissipation factor (D.F.)—0.53 to 1.64
Curie temperature ($Tc_p$)—$-1°$ to $15°$ C.

The large to small cation ratio of the 1.71 mole % CoO composition is 0.911 and, at 3.26 mole % CoO, the ratio is 0.884. Although the latter composition is below the preferred minimum L/S ratio of 0.90, both compositions provided suitable high K capacitors.

EXAMPLE 7

In the precursor compounds used for preparing the compositions described herein, such as $BaCO_3$, $TiO_2$, $ZrO_2$, $CaCO_3$ $MgCO_3$ and NiO, there are impurities which will vary depending on the supplier and the material lot. To evaluate the effects of impurities on the performance of capacitors made in accordance with the present invention, the composition of Sample No. 3 of Example 2 was used to prepare a number of disc capacitors with the composition for each capacitor modified by the addition of 0.25 weight % of the oxide of a typical metal impurity.

The specific metal oxide additions used were those of V, Al, Si, Mn, Na, K, Cr, Fe, Cu, Nb, Ta, Li and W. The mole % of the impurity additions in these compositions ranged from 0.10 to 0.40. Dielectric measurements made on the capacitors indicated the same general dependence of the Curie peak temperature on the oxygen partial pressure of the sintering atmosphere as was shown for the undoped Sample No. 3 of Example 2 (see FIG. 1). Overall, the curves of the impurity doped samples were shifted relative to the curve of Sample No. 3 in FIG. 1 by maximum of approximately $+10°$ C. To $-20°$ C. FIG. 4 shows, in a graph similar to that of FIG. 1, the effects on the Curie peak temperature with firing atmosphere of representative members of the impurity doped samples. The measured dielectric properties of the impurity doped samples were uniformly good. Thus, for samples fired at the higher oxygen partial pressure of approximately $10^{-7}$ atmosphere, the dielectric constants were all greater than 5900 and the dissipation factors were all less than about 2.00%. No adverse effects, resulting from impurities at the concentrations tested, were observed.

EXAMPLE 8

In order to determine the effects of variations in the firing temperature of the ceramic compositions, disc capacitors were prepared in the same manner as in Example 1. These capacitors were prepared from a composition substantially the same as Sample 3 (see, Table 3).

The disc capacitors in the present example were then fired at temperatures of 1375°, 1400° and 1425° C. The results at 1400° C. were similar to those reported in Table 2 for Sample 3. The results at 1375° and 1425° C. are given in Table 7 and show that the physical properties of the capacitors do not vary significantly in this temperature range.

TABLE 7

| Temp. (°C.) | Sintering Atmosphere (PO2) | K | D.F. (%) | Curie Temp. (°C.) |
| --- | --- | --- | --- | --- |
| 1375 | $3.5 \times 10^{-7}$ | 7500 | 2.4 | 19 |
| 1425 | $3.0 \times 10^{-7}$ | 8500 | 2.2 | 13 |
| 1375 | $8.9 \times 10^{-9}$ | 5000 | 0.6 | $-5$ |
| 1425 | $3.6 \times 10^{-9}$ | 6400 | 1.1 | $-5$ |
| 1375 | $7.9 \times 10^{-11}$ | 6000 | 1.2 | 13 |
| 1425 | $5.2 \times 10^{-12}$ | 6800 | 1.5 | 13 |

The upper limit of 5 mole % total dopant additions of MgO and NiO or CoO should only be considered as a useful upper limit. The preferred upper limits set forth hereinabove reflect generally the solubility limits of these metals in the ceramic and, thus, their useful limits. Greater amounts of these metals will "dilute" the dielectric properties.

What is claimed is:

1. A method of manufacturing a base metal electrode multilayer ceramic capacitor comprising the steps of:
    (a) preparing a tape from a ceramic powder, a binder, and a solvent;
    (b) forming a monolithic body of multiple layers of said tape and multiple layers of a metal electrode material, the electrode layers being interposed between each tape layer; and
    (c) sintering the body;
    characterized in that:
    said ceramic powder consists essentially of a major amount of BaO and $TiO_2$, the amounts of BaO and $TiO_2$ being approximately equal, a minor amount of CaO and $ZrO_2$ sufficient to shift and broaden the Curie peak of the ceramic to a preselected value, and MgO, wherein the MgO is at least approximately 1 mole % of the ceramic powder and the large to small cation ratio of the ceramic powder is less than or equal to 0.98 but greater than or equal to 0.89;
    said metal electrode material is selected from the group comprising Ni and Co; and said body is sintered at a temperature in the range of 1200° C. to 1425° C. in an atmosphere having an oxygen partial pressure which is between a maximum which is at least reducing to the oxide of the metal electrode material and a minimum of approximately $10^{-11}$ atmosphere.

2. A method as claimed in claim 1, characterized in that the body is sintered at a temperature in the range 1375° C. to 1425° C.

* * * * *